April 22, 1952  D. LEWIS  2,593,577
POULTRY FEEDING
Filed Aug. 10, 1950
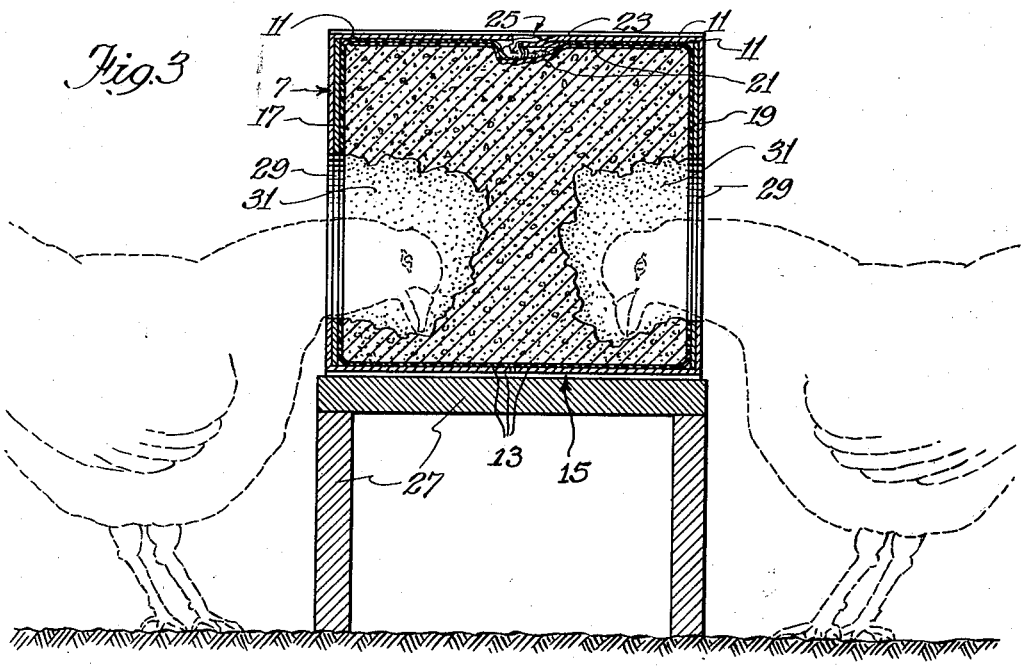
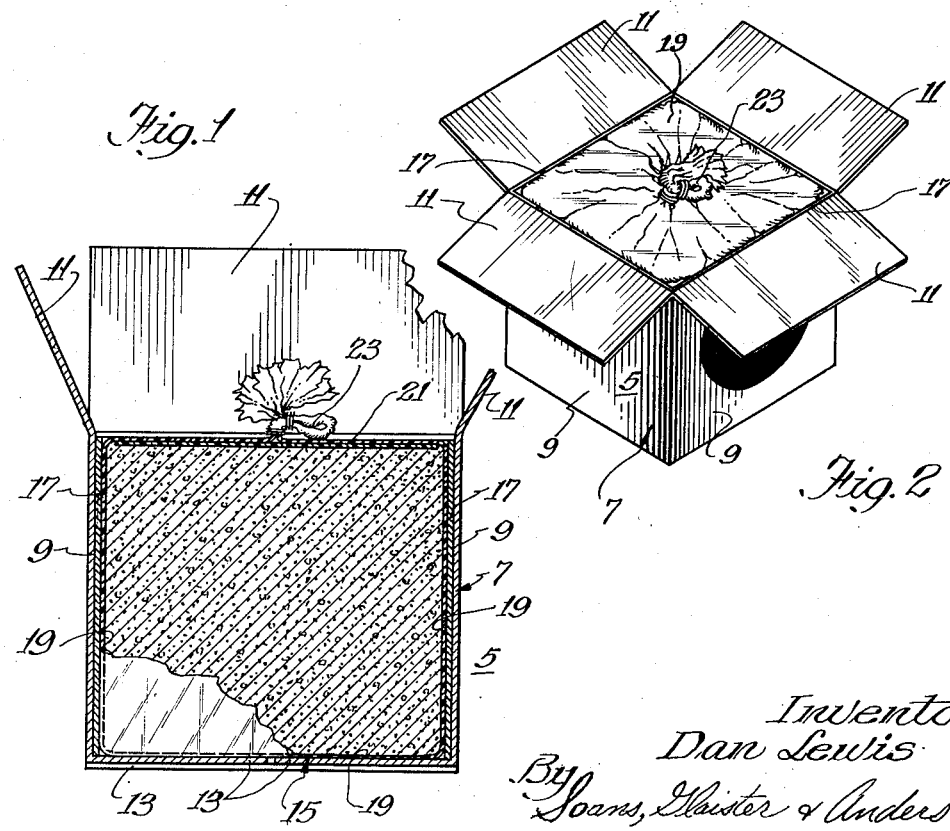
Inventor:
Dan Lewis
By Soans, Glaister & Anderson
Attys.

Patented Apr. 22, 1952

2,593,577

UNITED STATES PATENT OFFICE 2,593,577

POULTRY FEEDING

Dan Lewis, Danville, Ill., assignor to Consolidated Products Company, Danville, Ill., a corporation of Nebraska Application August 10, 1950, Serial No. 178,684

8 Claims. (Cl. 99—4)

The present invention relates, in general, to poultry feeding and more particularly to an improved poultry feeding unit and to an improved method of feeding poultry.

Heretofore, fowls such as chickens and turkeys, have been fed by providing a dry or a wet mixture of various feed materials and placing it in a feeder or trough from which the birds eat. These feed materials desirably comprise nutritionally balanced amounts of proteins, starches, sugars, fats, vitamins, etc. if maximum growth and egg production from a given amount of feed is to be obtained. However, when such mixtures are made on the farm, the nutritional value of the feed varies considerably unless the poultry raiser continuously mixes fresh batches of feed containing carefully measured amounts of the various substances, since many food materials and especially vitamin concentrates and food supplements deteriorate rapidly under storage conditions once they have been opened. As a result, it is difficult to provide a proper feeding ratio unless all of the food ingredients are fresh or have been recently analyzed to determine their potency.

Additionally, the fowl scatter the food from the ordinary feeder over a relatively large area. As a consequence, it is necessary to clean and disinfect the feeding troughs and surrounding areas at frequent intervals if the spread of disease in the flock is to be effectively prevented.

Accordingly, the principal object of this invention is the provision of an improved means of feeding poultry whereby the difficulties of the heretofore known feeding procedures are obviated. This object is accomplished by the provision of an improved feeding unit and an improved method of feeding the poultry.

Other objects and advantages of the invention will become known by reference to the accompanying drawings and the following description of a preferred embodiment of the invention.

In the drawings:

Fig. 1 is an elevational view partially in section of a feeding unit embodying various features of the invention;

Fig. 2 is a perspective view of the feeding unit shown in Fig. 1; and

Fig. 3 is an elevational view, partially in section, of the feeding unit shown in the preceding figures as employed in the feeding of poultry.

I have discovered that efficient feeding of poultry may be accomplished by combining food ingredients to provide a nutritionally balanced feed or a food supplement and then mixing these ingredients with an edible gel-forming or cementitious material to produce a coherent, plastic mass which will have substantial shape-sustaining properties at the maximum air temperatures found about the farm, e. g. the temperatures in the neighborhood of 100–105° F. A unitary body of this shape-sustaining material is then enclosed in a rigid shipping container having a wall in which a feed opening can be readily made.

The unitary body of material enclosed in the container comprises a feeding unit which may be readily shipped to the poultry grower who places the feeding unit at a convenient feeding station in a poultry house or barnyard. A feed opening which is large enough to admit the head and neck of the bird which is to be fed is then made in the wall of the container to provide access to the body of the feed material. The bird may then help itself to the food composition through the opening in the side of the container while the uneaten portion of the body of food material is securely retained within the container.

The body of feed materials within the container will not be affected by atmospheric conditions until after the container has been opened, and since the feeding units may be made in sizes which will insure fairly rapid consumption, the nutritional value of the feed materials will be retained until the material is completely consumed. Moreover, since the container may be of a disposable nature, the problem of sanitation in the poultry area will be greatly simplified. This cleaning problem is also reduced since the food material is retained within the container and is not scattered on the ground as pointed out above.

In addition to the above, certain serious difficulties encountered when prior art feeding methods are used are overcome by the use of the present invention. For example, it is possible to feed an entire, balanced diet to the fowl under all conditions since the only feed made available to the birds will be the desired food, and that food is in the form of a plastic, homogeneous mass, the individual ingredients of which cannot be separated out. Moreover, since the feed material is not spread around the feeding area, there is little chance of the feed material being contaminated with mold or other undesirable organisms. In addition, as will be pointed out hereinafter, it is possible to incorporate large amounts of moisture with the feed to make it more attractive to the birds, the provision of moisture also aiding in securing rapid and uniform production.

One particular food composition which may be readily fed to poultry in accordance with my invention is made from a mixture of various dairy products together with various food supplements. A feed of this character is especially desirable since it has been determined that the maximum growth of poultry such as chickens and turkeys, is obtained when they are fed upon a diet which includes large amounts of milk products such as whey solids, buttermilk solids, etc. Heretofore, however, the use of such milk products as a poultry feed has been greatly restricted since it is a difficult task on the farm to mix all of the ingredients into a balanced food. In addition, this resulting food is a liquid which is difficult to handle and to feed.

As one specific example of my improved feeding method and feeding unit, I shall describe my improved feeding method and unit as employed in connection with the feeding of nutritionally balanced food mixtures containing milk products and a substantial proportion of moisture.

A typical balanced food for chickens and turkeys which includes milk products comprises:

| | Parts by weight |
|---|---|
| Milk solids | 30–45 |
| Whey solids | 35–45 |
| Corn starch | 18–24 |
| Wheat germ meal | 2–3 |
| Fish oil (vitamins A and D) | 1.1 |
| Water | 130–190 |

In making the shape-sustaining mass, all of the materials set forth above with the exception of the starch may be mixed in a steam jacketed mixer and the temperature of the resulting mixture is raised to about 190° F. At this point, 18–24 parts by weight of starch, (edible starch in a granular condition) are added to the mixture and the heating is continued until the starch granules rupture and the heated mass becomes thick and viscous. The viscous material is then poured while hot into a rigid container and is cooled to produce a package of homogeneous, coherent plastic feed. In making the mixture, the water need not be supplied as such but may, instead, comprise a part of one or more of the other ingredients, for example the starch. Also, the whey solids which are utilized in the feed may be in the form of a concentrate which contains water, this water being considered as part of the total water needed.

Because of the jelly-like body of the composition, it is difficult to measure the viscosity or plasticity of the material with conventional apparatus. However, by utilizing instruments and techniques known in the art for determining plasticity or viscosity, it is possible to express the desired characteristics of the material with reasonable accuracy. Thus, utilizing a Brookfield viscometer equipped with a paddle, operated at a fixed speed, it is possible to calculate the stress-strain characteristics and elastic limit of the composition, in known units. Utilizing, with a Brookfield viscometer, a spindle having a blade .8 mm. in thickness and a rectangular body portion 4.8 mm. wide, and 4.7 mm. high with a triangular extension on the upper edge of the blade having an altitude of 1.5 mm. connected to a spindle 6.5 mm. in length and driving the spindle at 2 R. P. M., the stress characteristics of the composition can be calculated and expressed in dynes per square centimeter and strain in degrees of rotation of the paddle. Testing the material in this way, the preferred composition has stress characteristics at 68° F. between about 75,000 and 120,000 dynes per square centimeter at a strain of about 10° rotation and between 125,000 and 200,000 dynes per square centimeter at a strain of about 40° rotation. Compositions falling below the stress value expressed above are too soft, while compositions having a higher stress value are too tough for fowl to pull a piece readily from the composition.

Utilizing the same apparatus but with the conventional Brookfield scale calibrated in units of 0 to 100, the composition should have an elastic limit in the range between 20 and 40 units at 140° F. and between 65 and 100 units at about 41° F.

The procedure for making a feed of the type set forth above and the manner of determining its stress characteristics, is more fully set forth in the copending application Serial No. 177,771, of Lewis and Weisberg. This application was filed on August 4, 1950, and was assigned to the assignee of this invention.

The feeding unit which consists of the package containing the plastic poultry food is then shipped to the poultry raiser who places it at an appropriate feeding station. A hole large enough to admit the head and neck of the bird to be fed is made in one of the walls of the container without injuriously affecting the mechanical integrity of the container, whereby the birds may help themselves to the homogeneous mass of feed materials within the container.

The container 5 illustrated in the drawings is particularly adapted for use with the feed mixture described to provide the feeding unit. The container 5 includes an outer generally rectangular box 7 of paperboard, fiber-board, or corrugated paper, having four connected side walls 9 each of which has associated therewith an upper and a lower flap, indicated as 11 and 13 respectively in Figs. 1 and 3. The flaps 11 and 13 associated with the side walls 9 of the box 7 comprise the closures for the top and bottom of the box.

Prior to being filled with the heated feed material, the lower flaps 13 of the box are folded inwardly and glued together or otherwise sealed to provide a bottom closure generally indicated as 15. In the event that the hydraulic pressure of the heated and liquified feed materials is great enough to deform the box 7, as when a feeding unit of about 50 pounds is to be produced, a generally rectangular liner 17 of paperboard is disposed around the inside of the side walls 9 of the box to provide a reinforcement for the box. The liner 17 is proportioned to just fit within the box and is of a height which will provide reinforcing over the entire area of the side walls 9.

In order to provide a water and air resistant seal for the contents, a bag or continuous lining 19 of vapor and liquid resistant material such as is provided by a bag of polyethylene plastic, of rubber hydrochloride, or copolymerized vinyl chloride and vinyl acetate, is placed within the container. The upper, open end of the bag 19 is disposed upwardly to receive the heated feed materials.

A designated amount of the heated fluid is poured into the bag 19 and when the box 9 is substantially full a layer of sheet material which may be of the same composition as the material from which the bag is fabricated, is placed across the upper surface of the heated mass. A suitable amount of mold inhibitor such as acetic or propionic acid may then be sprayed upon the upper surface of the layer 21. The upper ends of the bag 19 are tied as illustrated as 23 in Figs. 1 and 3 in the drawings to provide a substantially air tight enclosure for the mass of material within the bag 19. The upper flaps 11 of the carton are then folded inwardly and glued to provide a top closure 25, care being taken that a portion of the bag 19 is secured to an upper portion of the container. This is accomplished in the illustrated structure by disposing a portion of the knot 23 (Fig. 3) between the top flaps 11 when they are glued together.

The heated material within the container is allowed to cool and, as has been pointed out, the material should preferably have a shear strength of between 75,000 and 120,000 dynes per square centimeter at a strain of about 10° rotation at a temperature of 68° F. This cooled material is then transported to the farm where the feeding unit is placed at a suitable feeding station as upon the stand 27 (Fig. 3). Holes 29 are cut in the sides of the box, these holes 29 being large enough to admit the heads and necks of the birds being fed. The birds peck at the plastic mass of feed materials and form voids 31 as shown in Fig. 3 of the drawings. As soon as these voids become large enough to undermine the material at the top of the container 5, it fractures and descends slowly to a point where it is accessible to the birds. Thus, the entire contents of the container may be fed without waste. During the progressive consumption of the contents of the container, the top of the bag remains secured to the top of the box so that it does not fall downwardly to interfere with the feeding birds.

Various changes may be made in the composition of the feed materials which constitute a part of the feeding unit. For example, while the gel forming or cementitious material employed in producing the specific feed material which has been described in starch, other similar edible substances may be employed, e. g. gelatin, edible seaweed gels, etc. Other feed combinations may also be used in a feeding unit of the type described as for example, ground grain may be incorporated into a mixture containing other feed materials and edible gel-forming or cementitious material. However, under all conditions, the mass should be a coherent plastic mass having substantial shape-sustaining properties at temperatures not more than about 100° F. but not so hard or rigid as to resist the pecking action of the birds. Desirably, for best results, the mass of feed materials should contain a substantial amount of moisture.

Various of the features of the invention which are believed to be new are set forth in the appended claims.

I claim:

1. A feeding unit for poultry comprising a coherent, plastic block of poultry feed material having substantial shape-sustaining properties, and containing a substantial amount of moisture, said block being enclosed in a rigid container having a wall in which a feed opening can be readily made.

2. A feeding unit for poultry comprising a coherent, plastic block of poultry feed material having substantial shape-sustaining properties below a temperature of 100° F., a moisture resistant wrapper enclosing said block, and a rigid paperboard container having a wall in which a feed opening can be made enclosing said wrapped block.

3. A feeding unit for poultry comprising a coherent, plastic block of poultry feed material, said block having stress characteristics at 68° F. between about 75,000 and 120,000 dynes per square centimeter at a strain of about 10° rotation and between 125,000 and 200,000 dynes per square centimeter at a strain of about 40° rotation, and containing a substantial amount of moisture, and a rigid container enclosing said block, said container having a wall in which a feed opening can be cut to admit the head and neck of the bird to be fed.

4. A feeding unit for poultry comprising a coherent, plastic block of poultry feed material having substantial shape-sustaining properties below about 100° F., and containing a substantial amount of moisture, a moisture resistant wrapper enclosing said block, and a rigid paperboard container having a wall in which a feed opening can be made enclosing said block and moisture resistant wrapper, said moisture resistant wrapper being secured to the container adjacent the upper portion thereof.

5. A feeding unit for poultry comprising a coherent, plastic block of poultry feed material, said block having a stress characteristic at 68° F. between about 75,000 and 120,000 dynes per square centimeter at a strain of about 10° rotation and between 125,000 and 200,000 dynes per square centimeter at a strain of about 40° rotation, and containing a substantial amount of moisture, a moisture resistant wrapper enclosing said block, and a rigid, paperboard container having a wall in which a feed opening can be made enclosing said wrapped block, said moisture resistant wrapper being secured to an upper portion of said container.

6. A feeding unit for poultry comprising a coherent, plastic block of poultry feed material having substantial shape-sustaining properties, said feed material including a substantial proportion of moisture, and said block being enclosed in a rigid container having a wall in which a feed opening can be made large enough to admit the head and neck of the bird to be fed, said feed material being sufficiently viscous, at temperatures below about 100° F., to remain in the container after the feed opening is made when the wall containing said opening is disposed in a substantially vertical plane.

7. A feeding unit for poultry comprising a coherent, plastic block of poultry feed material having substantial shape-sustaining properties, a major proportion of the solids of said feed materials being milk derivatives, said feed material also including a substantial proportion of moisture, and said block being enclosed in a rigid container having a wall in which a feed opening can be made large enough to admit the head and neck of the bird to be fed, said feed material being sufficiently viscous, at temperatures below about 100° F., to remain in the container after the feed opening is made when the wall containing said opening is disposed in a substantially vertical plane.

8. A feeding unit for poultry comprising a coherent, plastic block of feed material having substantial shape-sustaining properties below 100° F., a moisture resistant wrapper enclosing said block, and a rigid paperboard container having a wall in which a feed opening can be made large enough to admit the head and neck of the bird to be fed enclosing said wrapped block, said feed material being sufficiently viscous, at temperatures below about 100° F., to remain in the container after the feed opening is made when the wall containing said opening is disposed in a substantially vertical plane.

DAN LEWIS.

REFERENCES CITED

The following references are of record in the file of this patent:

UNITED STATES PATENTS

| Number | Name | Date |
|---|---|---|
| 148,632 | Tompkins | Mar. 17, 1874 |
| 1,645,771 | Pillsbury | Oct. 18, 1927 |
| 1,719,923 | Cochran | July 9, 1932 |
| 1,916,230 | Murray | July 4, 1933 |
| 1,922,919 | Yamamoto | Aug. 15, 1933 |
| 2,235,959 | Copeman | Mar. 25, 1941 |